(12) United States Patent
Ramanujan et al.

(10) Patent No.: US 9,952,801 B2
(45) Date of Patent: Apr. 24, 2018

(54) ACCELERATED ADDRESS INDIRECTION TABLE LOOKUP FOR WEAR-LEVELED NON-VOLATILE MEMORY

(71) Applicant: Intel Corporation, Santa Clara, CA (US)

(72) Inventors: Raj K. Ramanujan, Federal Way, WA (US); Jun Zhu, Newark, CA (US); Mohamed Arafa, Chandler, AZ (US); Woojong Han, Tustin, CA (US); Jordan A. Horwich, Corona, CA (US)

(73) Assignee: Intel Corporation, Santa Clara, CA (US)

( * ) Notice: Subject to any disclaimer, the term of this patent is extended or adjusted under 35 U.S.C. 154(b) by 234 days.

(21) Appl. No.: 14/752,554

(22) Filed: Jun. 26, 2015

(65) Prior Publication Data

US 2016/0378396 A1    Dec. 29, 2016

(51) Int. Cl.
| | | |
|---|---|---|
| *G06F 12/02* | (2006.01) | |
| *G06F 3/06* | (2006.01) | |
| *G06F 12/1027* | (2016.01) | |
| *G06F 12/1009* | (2016.01) | |
| *G06F 12/0866* | (2016.01) | |

(52) U.S. Cl.
CPC .......... *G06F 3/0649* (2013.01); *G06F 3/0616* (2013.01); *G06F 3/0685* (2013.01); *G06F 12/0246* (2013.01); *G06F 12/0866* (2013.01); *G06F 12/1009* (2013.01); *G06F 12/1027* (2013.01); *G06F 2212/202* (2013.01); *G06F 2212/214* (2013.01); *G06F 2212/22* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 2011/0276827 A1 | 11/2011 | Royer, Jr. et al. | |
| 2012/0173794 A1* | 7/2012 | Royer, Jr. ........... | G06F 11/1451 711/103 |
| 2013/0185526 A1* | 7/2013 | de la Iglesia ....... | G06F 11/2094 711/154 |
| 2013/0282967 A1 | 10/2013 | Ramanujan | |
| 2013/0318288 A1* | 11/2013 | Khan ................... | G06F 3/0608 711/103 |
| 2013/0339574 A1 | 12/2013 | Franceschini et al. | |
| 2014/0006848 A1 | 1/2014 | Ramanujan et al. | |

(Continued)

OTHER PUBLICATIONS

International Search Report and Written Opinion for PCT Patent Application No. PCT/US2016/034395 dated Sep. 1, 2016, 13 pgs.

*Primary Examiner* — Charles Rones
*Assistant Examiner* — Ryan Dare
(74) *Attorney, Agent, or Firm* — Compass IP Law PC

(57) ABSTRACT

Embodiments are generally directed to accelerated address indirection table lookup for wear-leveled non-volatile memory. A embodiment of a memory device includes non-volatile memory; a memory controller; and address indirection logic to provide address indirection for the nonvolatile memory, of the address indirection logic to maintain an address indirection table (AIT) in the nonvolatile memory, the AIT including a plurality of levels, and copy at least a portion of the AIT to a second memory, the second memory having less latency than the first memory.

18 Claims, 7 Drawing Sheets

(56) References Cited

U.S. PATENT DOCUMENTS

2014/0129767 A1 5/2014 Ramanujan et al.
2015/0212935 A1* 7/2015 Roeder ............... G06F 12/0246
 711/103
2016/0019160 A1* 1/2016 Mohan ................ G06F 12/0246
 711/208

* cited by examiner

ACCELERATED ADDRESS INDIRECTION TABLE LOOKUP FOR WEAR-LEVELED NON-VOLATILE MEMORY

TECHNICAL FIELD

Embodiments described herein generally relate to the field of electronic devices and, more particularly, to accelerated address indirection table lookup for wear-leveled non-volatile memory.

BACKGROUND

Computer operations include the use of non-volatile memory (NVM) to maintain certain data. Because of the wear caused to non-volatile memory by writing actions, the NVM based memory systems use wear-leveling in order to maximize write endurance.

Further, data is commonly mapped to different locations in the memory using address re-directing, wherein the system addresses and non-volatile memory addresses are translated in a table, commonly referred to as an Address Indirection Table (AIT).

However, AITs can be very large depending on the size of the non-volatile memory, as well as the size of the wear-level block. Large tables generally are required reside in the non-volatile memory itself, and thus need to be wear-leveled as well, causing the AIT to be a multi-level look-up structure with a high performance cost.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
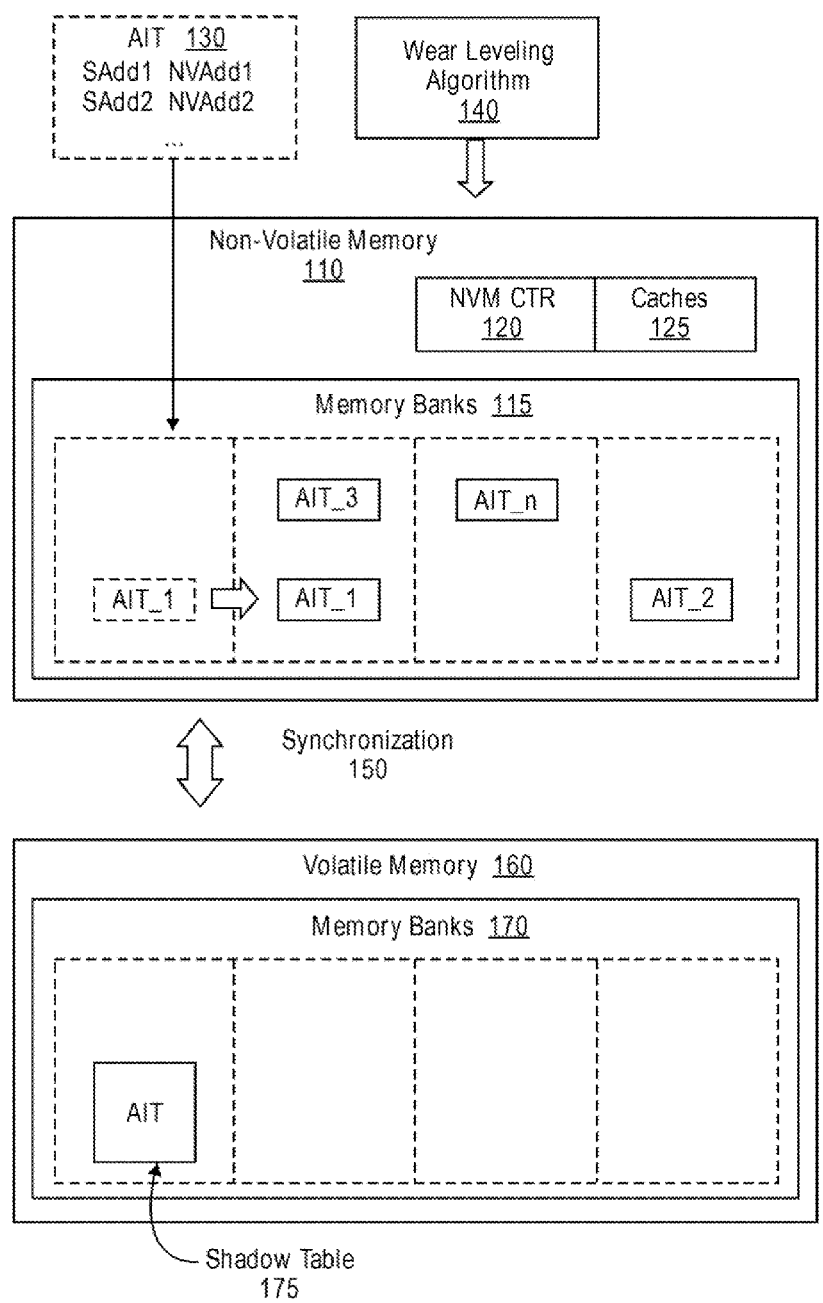
FIG. 1 is an illustration of nonvolatile memory with shadow table access to provide accelerated address indirection, according to an embodiment.

Embodiments described herein are generally directed to accelerated address indirection table lookup for wear-leveled non-volatile memory.

For the purposes of this description:

"Main memory", "primary memory", or "system memory" is computer memory that a processor or computer primarily accesses for programs and data. Main memory is commonly random access memory (RAM), and specifically is commonly dynamic random access memory (DRAM).

"Volatile memory" means memory that does not retain a stored value without connection to a power source. Volatile memory includes RAM, such as DRAM.

"Nonvolatile memory" means memory that retains a stored value without connection to a power source. Non-volatile memory includes, but is not limited to, flash memory (including NAND flash memory, such as included in non-volatile memory chips, and NOR flash memory), and other suitable non-volatile memory such as phase change memory (PCM), a byte addressable three dimensional cross point memory, a resistive memory, nanowire memory, ferro-electric transistor random access memory (FeTRAM), mag-netoresistive random access memory (MRAM) memory that incorporates memristor technology, spin transfer torque (STT)-MRAM, and byte addressable random access non-volatile memory.

Nonvolatile memory (NVM) based memory systems utilize wear-leveling in order to extend the write endurance of the memory, where nonvolatile memory generally has a limited number erase cycles before the memory is no longer reliable. Wear-leveling involves re-directing writes from one physical NVM block to another in order to ensure uniform wearing of all blocks. Re-directing writes implies an address indirection mechanism that can re-map CPU generated memory address (System Address) to an NVM Address that can be re-located based on the wear-leveling algorithm.

However, Address Indirection Tables (AIT) for nonvolatile memory can be very large depending on the size of the NVM as well as the size of the wear-level block. Such large tables generally need to reside in the NVM itself, and thus need to be wear-leveled as well to maximize the lifespan of the memory. For this reason, the AIT presents a multi-level look-up structure that has very high performance cost.

To mitigate the impact of address redirection in wear leveling, certain conventional acceleration mechanisms, such as caching of each level of the lookup structure, are commonly employed, with the caches generally being resident in the NVM Controller. However, such caches generally do not perform well for random access patterns as there will be high number of misses in the address lookup process.

In some embodiments, an apparatus, system, or process provides accelerated address indirection table lookup for wear-leveled non-volatile memory, thus allowing for memory operation across all types of access patterns in an efficient manner. In some embodiments, in addition to maintenance of caches for the AIT, a shadow copy of the multi-level AIT Table structure for a first non-volatile memory is stored in a second memory, where such table will include all or a part of the AIT. More specifically, the AIT in the second memory may include one or more levels of the AIT. The second memory in general is a memory with less latency than the non-volatile memory, such as a volatile memory, which may include DRAM memory. In some embodiments, the second memory is not a part of the main memory of a system visible to the CPU (Central Processing Unit). The second memory is generally referred to as a volatile memory in this description.

In some embodiments, the table contained in the volatile memory includes at least the last level of the AIT and thus will provide a successful nonvolatile memory lookup presuming the AIT data has been stored and there is no error. In some embodiments, the volatile memory copy is closely tied to the multi-level caching of the AIT structure in the NVM Controller, the AIT tables stored in volatile memory and the AIT tables stored in non-volatile memory both being synchronously updated on wear-level moves.

In some embodiments, in a process utilizing a synchronized shadow copy of AIT tables in the volatile memory there, any misses from the AIT caches in the controller are generally to only go to the volatile memory copy to obtain the final translation. At the same time, any exception condition can still utilize the non-volatile memory tables when needed. In this manner, a consistent performance across random and sequential accesses that is at most limited by the volatile memory latency for accessing the shadow AIT.

In some embodiments, operation of a shadow AIT copy allows implementation of normal wear-leveling of the non-volatile memory based AIT structure, while at the same time providing consistent access latency using the caches and the volatile memory copy alone. In contrast, conventional systems typically avoid wear-leveling the non-volatile memory based AIT structures in order to maintain the single level of the AIT structure. However, lack of wear-leveling in general will reduce the overall lifespan of the memory. It is noted that the specific wear leveling algorithm applied to a non-volatile memory may be any of the applicable wear leveling algorithms for the memory that are known by those of skill in the art, and the details of such algorithms are outside the discussion provided herein.

In some embodiments, an apparatus, system, or process further applies a small granularity in wear leveling in comparison with conventional operation, the apparatus, system, or process using, for example, page-sized wear-level blocks. In contrast, wear-level granularity in conventional operations utilizes larger blocks, with increased overhead for wear-leveling. Such larger granularity is typically targeted for block storage use that depends on large sequential accesses to maximize throughput. In some embodiments, smaller, page-sized wear-level blocks with low overhead for wear leveling is as well optimized for fine granularity random accesses used for memory-like semantics.

FIG. 1 is an illustration of nonvolatile memory with shadow table access to provide accelerated address indirection, according to an embodiment. FIG. 1 is intended as a conceptual illustration, and is not intended to represent physical locations, sizes, or connections. As illustrated, a nonvolatile memory 110, such as flash memory or other nonvolatile memory, includes certain memory banks 110 for the storage of data. The nonvolatile memory 110 further includes a nonvolatile memory controller 120 including logic for address indirection control, wherein the control may include caches 125 for the storage of entries for the address indirection. In some embodiments, the nonvolatile memory stores an address indirection table 130 to provide mapping between system addresses and nonvolatile memory addresses. In some embodiments, the nonvolatile memory may be a portion of a computing system.

In some embodiments, the storage of the AIT 130 includes application of a wear leveling of blocks storing elements of the AIT 130 with the data 110, which is illustrated by certain blocks of the table (AIT_1, AIT_2, AIT_3, and continuing through AIT_n) being scrambled in the memory locations. The wear leveling may include, for example, the illustrated transfer of block AIT_1 of the AIT table data.

In some embodiments, an apparatus, system, or process provides for a shadow AIT (shadow table) 175 stored in volatile memory 160, the shadow table 175 including one or more levels of the AIT 130 stored in the non-volatile memory 110. As the volatile memory can store the table in a single level, all addresses may be available in a lookup of the volatile memory.

In some embodiments, the shadow table 175 and memory cache allow for accelerated lookup of the address indirection table, allowing for reading of a full address from the shadow AIT stored in the volatile memory upon a miss in the memory cache(s) 125. The AIT structure for supporting wear-leveling in a multi-level table that allows wear leveling of the structure itself, and hence is relocatable within the nonvolatile memory.

Figure 2:
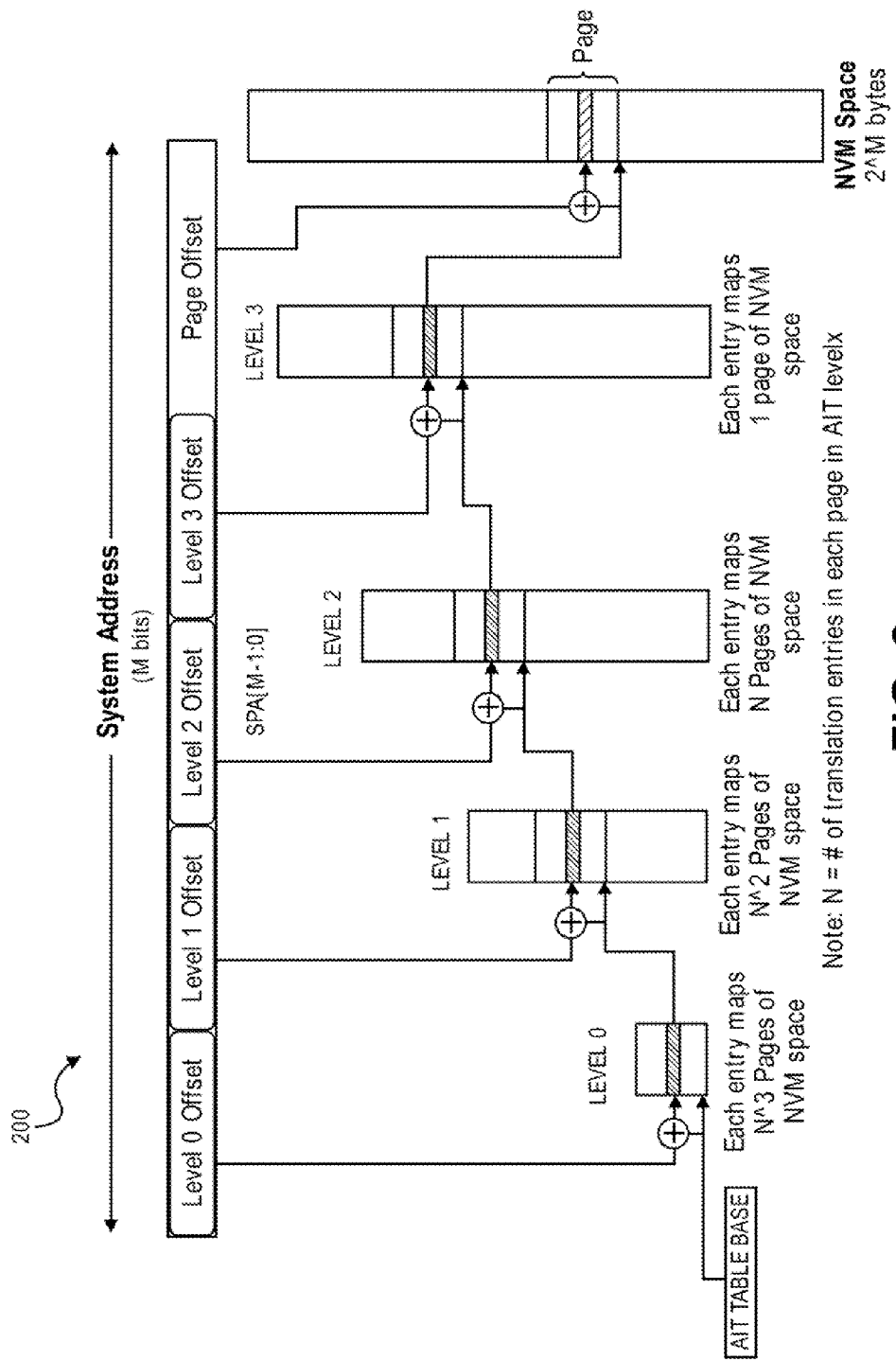
FIG. 2 is an illustration of an example of an address indirection table structure.

FIG. 2 is an illustration of an example of an address indirection table structure. As illustrated, in a conventional table access, a lookup of system address 200 for a multi-level table results in a normal sequence of look-ups typically referred to as a "Page-Walk". In this structure, the table includes four levels for the $2^M$ bytes (M-bit address) non-volatile memory address space, the levels being illustrated as Level 0, Level 1, Level 2, and Level 4. Thus, in this example each entry of Level 0 maps $N^3$ pages of NVM space, each entry of Level 1 maps $N^2$ pages of NVM space, each entry of Level 2 maps N pages of NVM space, and each entry of Level 3 maps one page of NVM space. However, the particular structure illustrated in FIG. 2 is only one example of a table structure, and embodiments are not limited to this example.

In FIG. 2, the size of each page is the same as a size of the wear-level block. With this structure, each page of the AIT structure may be relocated according to wear-leveling requirements. When this relocation for wear-leveling occurs, the pointer in the table in the previous level is modified appropriately. The last level of the table has the final translation for the NVM address space accessible by the System Address.

Without any caching, the structure illustrated in FIG. 2 would require 4 NVM look-ups before obtaining the address to satisfy an original CPU access. To avoid this number of lookups for each access, an NVM Controller may contain a cache for each level, with the final level cache providing the entire translation. With this structure, any CPU access will first lookup only the final level, which is sometimes referred to as the TLB (Translation Lookaside Buffer), and only if this lookup in the TLB misses, proceed to lookup the prior levels as needed to obtain an NVM address to find the translation in the nonvolatile memory. However, a page-walk in this example may require five reads, a read of the cache for each level and a read of the nonvolatile memory address space.

Figure 3:
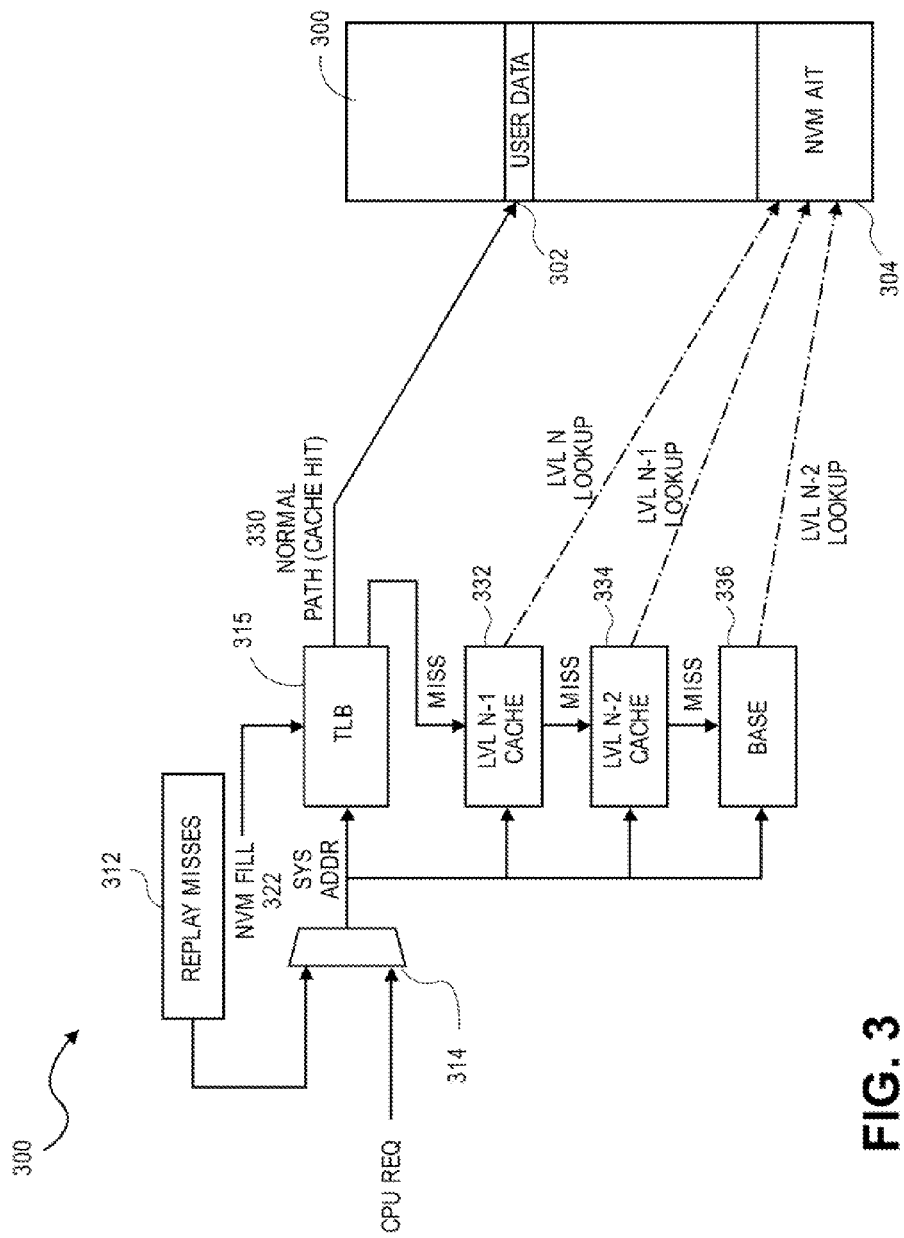
FIG. 3 is an illustration of an address lookup for a nonvolatile memory including caching.

FIG. 3 is an illustration of an address lookup for a nonvolatile memory including caching. In this illustration, for a nonvolatile memory 300 including user data 302 and including NVM AIT 304 for address remapping, a call from either CPU request or a replay miss 312 (shown as selected by multiplexer 314), is initially accessed by a lookup of the address in the TLB 320, which has received the data illustrated as NVM Fill 322. As illustrated in FIG. 3, the normal path (a cache hit) thus results in access to the user data 330.

However, if there is a miss in the TLB 320, this is followed by a call to the Level N-1 Cache 332 (a Level 3 Cache for a 4-level structure), the Level N lookup. If this results in a miss, there is call to the Level N-2 Cache 334 (Level N-1 Lookup). If this also results in a miss, there is then a call to the base cache 336 (Level N-2 Lookup).

The process illustrated in FIG. 3 provides acceptable performance when the cache hit rate is high, which will occur when there is sufficient locality in the CPU request addresses. However, many applications have sufficiently random behavior to make the caching performance unacceptable as there will be many misses. Such applications may see a very high level of variation in NVM latencies, such as, in one implementation, an unloaded read latency that varies by as much as 5×.

In some embodiments, in order to prevent variation in read latency, and with the intent to provide consistent latency that is closer to the most efficient path for an address lookup, an enhanced and accelerated lookup process is provided by implementing a DRAM (or other memory) based shadow copy, the DRAM copy providing a single level representation of the AIT structure, representing the last level of the AIT structure.

Figure 4:
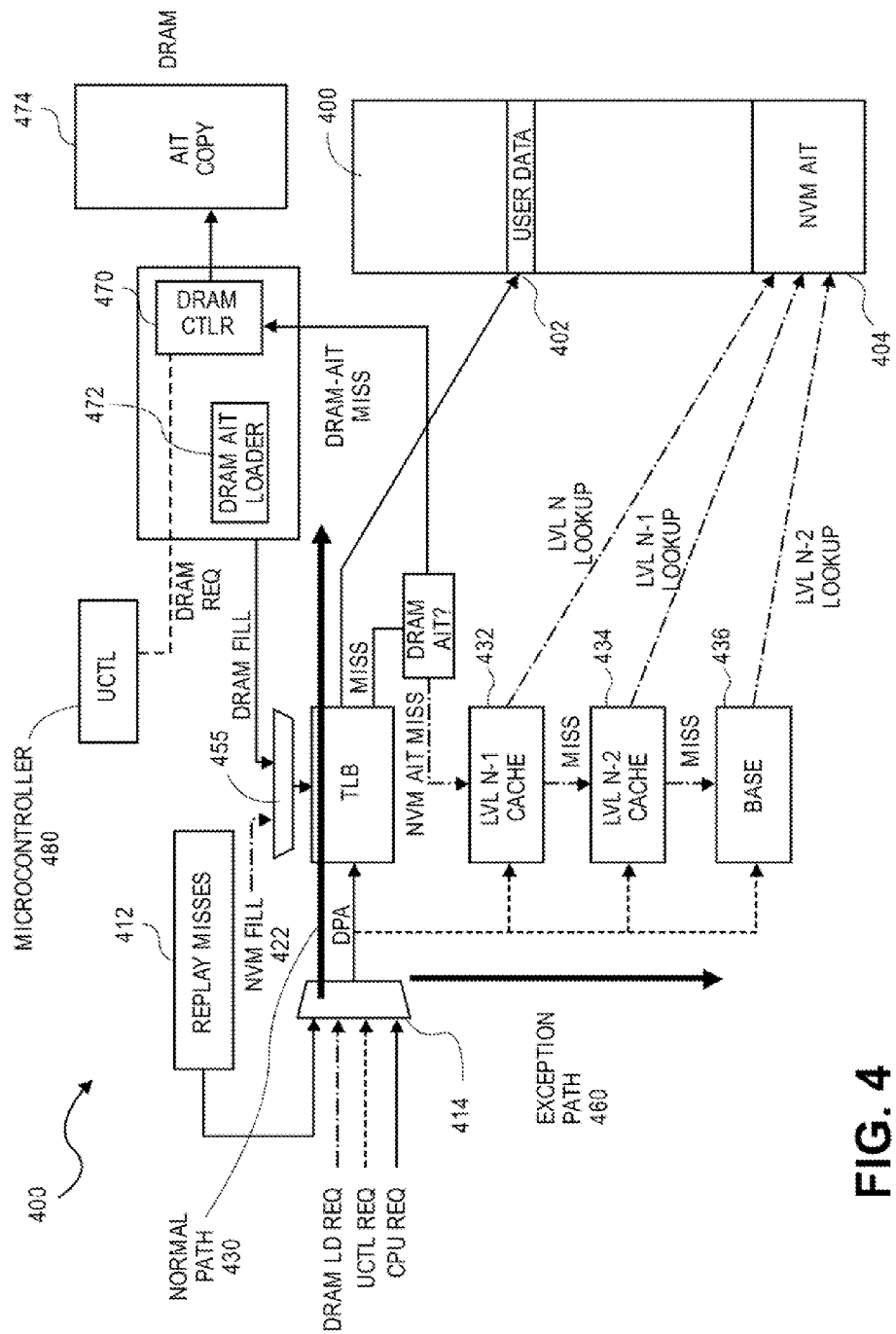
FIG. 4 is an illustration of an accelerated lookup for a nonvolatile memory according to an embodiment.

FIG. 4 is an illustration of an accelerated lookup for a nonvolatile memory according to an embodiment. As illustrated in FIG. 4, a nonvolatile memory 400 stores user data 440 and NVM AIT 450 for address remapping. A call from either a CPU request or a replay miss 412 (via multiplexer 414), is initially accessed by a lookup of the address in the TLB 415, which has received the data illustrated as NVM Fill 422, for the normal lookup path 430.

In some embodiments, if there is a miss in the TLB 415, there is then a lookup of a copy of one or more levels of the AIT table in a second memory having less latency than the nonvolatile memory 400, such as DRAM for the illustrated AIT copy 474. In some embodiments, the DRAM is not a portion of main memory for the system. In some embodiments, on a system power-on, the DRAM copy of the one or more levels of the AIT table is loaded from NVM 400 to the DRAM by the by the microcontroller 480. In some embodiments, the DRAM AIT copy 474 includes the last level of the AIT and thus (if the AIT table is loaded and complete) a hit will occur in the AIT, and the user data 402 can be accessed.

However, the CPU may access NVM 400 while the loading of the AIT for the DRAM is proceeding (shown as the DRAM fill via multiplexer 455, as driven by DRAM AIT loader 472) and thus the data of the AIT copy 474 may not be complete. In some embodiments, if a DRAM AIT entry is not valid (as when the loading is not complete or there is an error, shown as DRAM-AIT Miss directed to DRAM controller 470), the exception path 460 via the Level N-1 cache 432, the Level N-2 cache 434, and the base cache 436 is available. Thus, the exception path may be traversed in the same or similar manner as when no DRAM copy AIT is present.

In some embodiments, as the DRAM AIT copy 474 gets filled, a TLB miss will lookup the DRAM and use it to both fill the cache as well as to lookup the NVM address. In this manner, the maximum cost of a cache miss in the case of purely random accesses is at most the cost of a lookup in the second memory holding the AIT copy, which is approximately 50 ns (nanoseconds) for DRAM. By contrast, traversing the NVM page tables in the exception path 460 can require hundreds of nanoseconds, thus providing a significant improvement in latency over conventional lookup in usual circumstances, and, in a worse case when the exception path is required, the process provides a similar latency as the conventional operation.

Other than during initial loading of the DRAM, the exception path 460 may also be traversed in the event of DRAM look-up error that is uncorrectable. In this case, the main table will be looked up to retrieve the translation. If the DRAM location has a hard error, this translation may be permanently cached in the NVM controller.

In some embodiments, on every wear level move, the microcontroller 480 will update the DRAM AIT copy 474 and the NVM AIT 404 at the same time. This process allows for maintain the tables in sync with each other. Further, the synchronization of the DRAM and NVM avoids the necessity of writing back any of the DRAM contents to the NVM table on a power-down.

Figure 5:
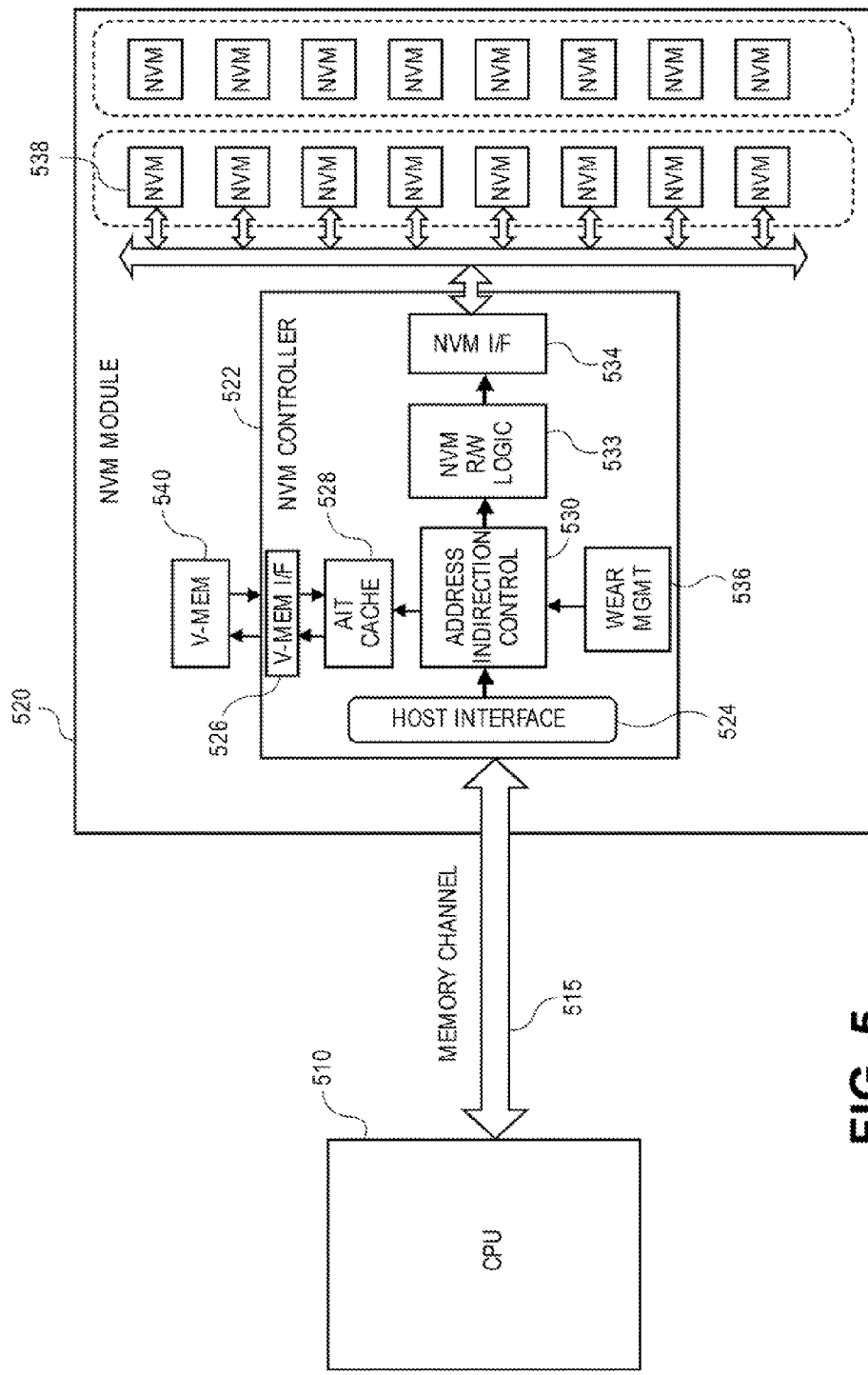
FIG. 5 is a diagram to illustrate a nonvolatile memory module according to embodiment.

FIG. 5 is a diagram to illustrate a nonvolatile memory module according to embodiment. As illustrated in FIG. 5, a nonvolatile memory (NVM) module 520 may be coupled with a central processing unit (CPU) 510 via a memory channel 515 using host interface 524. The NVM module 520 includes an NVM controller 522 and nonvolatile memory element 538 linked via a nonvolatile memory interface 534.

In some embodiments, the NVM controller 522 includes an address indirection control 530 that is subject to wear management 536 to provide for wear leveling of the memory 538. In some embodiments, the NVM controller 528 includes AIT cache 528, which may include a cache for each of multiple levels for the memory structure. Further, the NVM controller 522 includes a volatile memory interface 526 for connection with volatile memory 540 (located outside of the NVM module 520), wherein a copy of an address indirection table for the nonvolatile memory 538 is stored to the volatile memory 540, and includes NVM read/write logic 533 to handle requests for read and write operations for the NVM 538.

Figure 6:
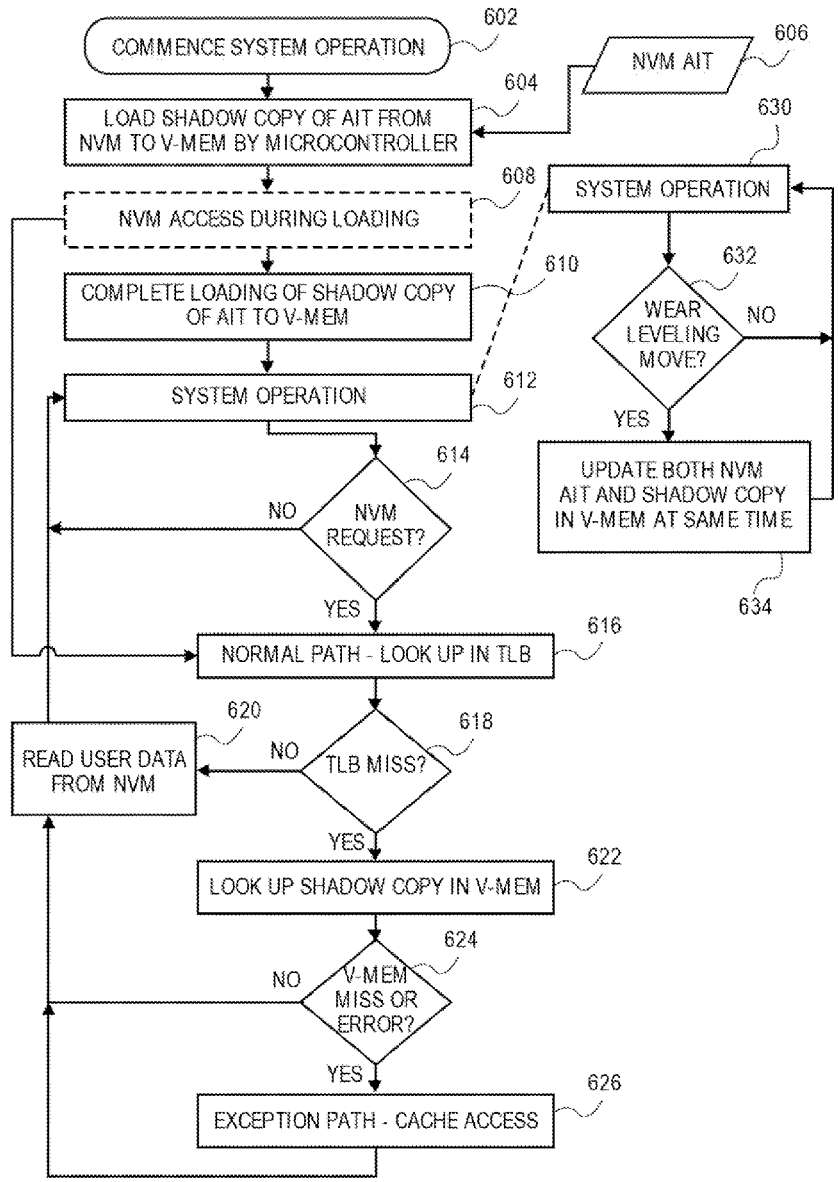
FIG. 6 is a flowchart to illustrate a process for nonvolatile memory lookup according to an embodiment.

FIG. 6 is a flowchart to illustrate a process for nonvolatile memory lookup according to an embodiment. In some embodiments, upon commencing system operation 602, such as at power up or reset of a system, a microcontroller will operate to load a copy of all or part of the nonvolatile memory AIT, illustrated as NVM AIT 606, from the nonvolatile memory into a volatile memory (or other memory with less latency than the nonvolatile memory). As the system is operating, there may be nonvolatile memory access during the loading of the AIT into the volatile memory 608, which then follows the normal lookup path 616, further described below.

Upon the completion of the loading process for the volatile memory AIT, the system may proceed with system operation 612. In some embodiments, upon a nonvolatile memory request 614, the lookup process utilizes a normal lookup path including an initial lookup in the TLB 616. If there is successful lookup, the user data is read from the nonvolatile memory 620. However, if there is a TLB miss 618, the lookup path continues with a lookup in the volatile memory copy of the AIT 622, which if successful allows reading the user data from the nonvolatile memory 620. However, if there is a volatile memory AIT miss (such as for a memory access during loading of the volatile memory 608) or if there is an error 624, then the process continues to the exception path, utilizing the cache memory storage for each level 626 to obtain the address for use in reading the user data from the nonvolatile memory 620.

In some embodiments, at any time during the system operation 630, the applicable wear leveling algorithm is also applied, and upon any wear leveling move 632, the system updates both the nonvolatile memory AIT and the volatile memory AIT copy at the same time 634, which allows for maintaining the AIT versions in sync with each other.

Figure 7:
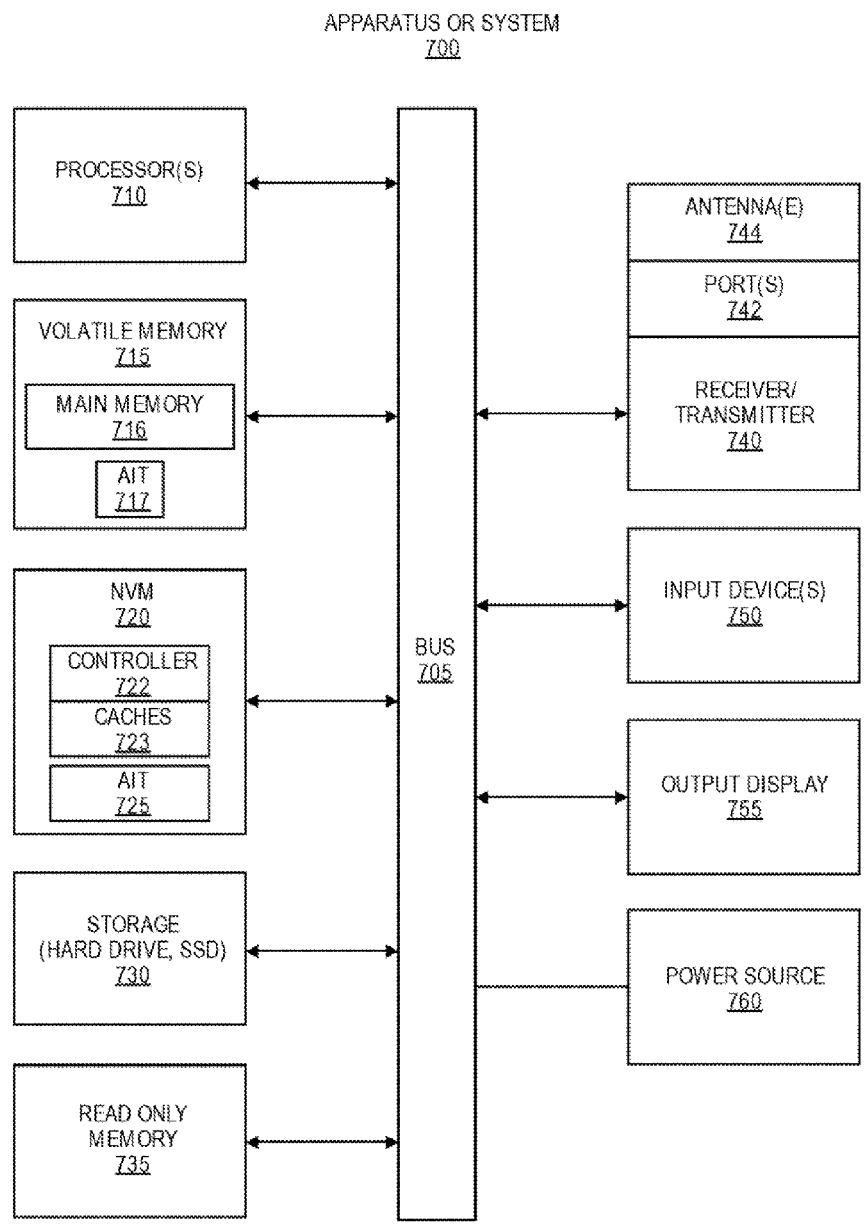
FIG. 7 is an illustration of an embodiment of an electronic apparatus or system including accelerated lookup for non-volatile memory.

FIG. 7 is an illustration of an embodiment of an electronic apparatus or system including accelerated lookup for nonvolatile memory. In this illustration, certain standard and well-known components that are not germane to the present description are not shown. Elements shown as separate elements may be combined, including, for example, an SoC (System on Chip) combining multiple elements on a single chip. The apparatus or system (referred to generally as a system 700) may include, but is not limited to, a computing system.

In some embodiments, the system 700 may include a processing means such as one or more processors 710 coupled to one or more buses or interconnects for processing information, shown in general as bus 705. The processors 710 may comprise one or more physical processors and one or more logical processors. In some embodiments, the processors may include one or more general-purpose processors, such as a CPU, or special-processor processors.

The bus 705 is a communication means for transmission of data. The bus 705 is illustrated as a single bus for simplicity, but may represent multiple different interconnects or buses and the component connections to such interconnects or buses may vary. The bus 705 shown in FIG. 7 is an abstraction that represents any one or more separate physical buses, point-to-point connections, or both connected by appropriate bridges, adapters, or controllers.

In some embodiments, the system 700 further comprises volatile memory 715 or other dynamic storage device or element, which includes a main memory 716 for storing information and instructions to be executed by the processors 710. Volatile memory 715 may include, but is not limited to, dynamic random access memory (DRAM). The system 700 further includes nonvolatile memory 720, wherein the nonvolatile memory may include an address indirection table, AIT 725, and controller 722, which may contain a cache memory 723 for each level of the memory structure. In some embodiments, the volatile memory further includes a shadow copy 717 of all or part of the AIT 725 that is stored in the nonvolatile memory 720. In some embodiments, a lookup path for the nonvolatile memory 720 includes a lookup of the shadow copy AIT 717 of the volatile memory 715 if a lookup of a TLB of the nonvolatile memory 720 results in a miss.

The system 700 also may include a storage for data 730, which may include a hard drive or solid state drive (SSD), and a read only memory (ROM) 735 or other static storage device for storing static information and instructions for the processors 710.

In some embodiments, the system 700 includes one or more transmitters or receivers 740 coupled to the bus 705. In some embodiments, the system 700 may include one or more antennae 744, such as dipole or monopole antennae, for the transmission and reception of data via wireless communication using a wireless transmitter, receiver, or both, and one or more ports 742 for the transmission and reception of data via wired communications. Wireless communication includes, but is not limited to, Wi-Fi, Bluetooth™, near field communication, and other wireless communication standards.

In some embodiments, system 700 includes one or more input devices 750 for the input of data, including hard and soft buttons, a joy stick, a mouse or other pointing device, a keyboard, voice command system, or gesture recognition system.

In some embodiments, the system 700 includes an output display 755, where the display 755 may include a liquid crystal display (LCD) or any other display technology, for displaying information or content to a user. In some environments, the display 755 may include a touch-screen that is also utilized as at least a part of an input device 750. Output display 755 may further include audio output, including one or more speakers, audio output jacks, or other audio, and other output to the user.

The system 700 may also comprise a battery or other power source 760, which may include a solar cell, a fuel cell, a charged capacitor, near field inductive coupling, or other system or device for providing or generating power in the system 700. The power provided by the power source 760 may be distributed as required to elements of the system 700.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, memory device includes a first nonvolatile memory; a memory controller; and address indirection logic to provide address indirection for the nonvolatile memory, wherein to provide address indirection, the address indirection logic is to maintain an address indirection table (AIT) in the nonvolatile memory, the AIT including a plurality of levels, and copy at least a portion of the AIT to a second memory, the second memory having less latency than the first memory.

In some embodiments, the memory controller includes AIT caches, the AIT caches including a cache for each level of the AIT stored in the nonvolatile memory.

In some embodiments, upon a miss in a translation lookaside buffer (TLB) for the nonvolatile memory, a lookup of the nonvolatile memory is to include a lookup of the copy of the AIT in the second memory.

In some embodiments, upon a miss or error in the one or more levels of the AIT in the second memory, a lookup of the nonvolatile memory is to include a lookup of at least one of the AIT caches.

In some embodiments, the nonvolatile memory is subject to wear leveling, the wear leveling including a portion of the nonvolatile memory that stores the AIT. In some embodiments, the AIT stored in the nonvolatile memory and the AIT stored in the second memory are each to be updated upon a wear level move.

In some embodiments, the at least a portion of the AIT copied to the second memory includes a last level of the AIT.

In some embodiments, the second memory comprises dynamic random access memory (DRAM).

In some embodiments, a method includes storing one or more levels of an address indirection table (AIT) of a nonvolatile memory into a second memory, the second memory comprising a volatile memory; receiving a request for an address of the nonvolatile memory; and performing a lookup of the address including performing a lookup of an address in the nonvolatile memory, and, upon the address lookup resulting in a miss, performing a lookup of the AIT stored in the volatile memory.

In some embodiments, the method further includes caching address entries for each level of the AIT in AIT caches, and, upon the lookup of the AIT stored in the volatile memory resulting in a miss, performing a lookup of at least one of the AIT caches.

In some embodiments, the method further includes performing wear leveling of the nonvolatile memory, wherein the performance of wear leveling includes wear leveling of memory locations of the AIT stored in the nonvolatile memory.

In some embodiments, the method further includes updating the AIT in the nonvolatile memory and the AIT stored in the volatile memory upon a wear level move in the performance of the wear leveling.

In some embodiments, the storing of the last level of the AIT of the nonvolatile memory into the volatile memory is performed upon power up of a system including the nonvolatile memory.

In some embodiments, the storing of the one or more levels of the AIT includes storing a last level of the AIT.

In some embodiments, the volatile memory comprises dynamic random access memory (DRAM).

In some embodiments, a computing system includes: a network interface; a central processing unit (CPU) to process data and instructions and communicatively coupled with the network interface; a volatile memory, the volatile memory including a main memory to store data and instructions for processing; and a nonvolatile memory device including nonvolatile memory, a memory controller, and address indirection logic to provide address indirection for the nonvolatile memory, wherein the address indirection logic is to: maintain an address indirection table (AIT) in the nonvolatile memory, the AIT including a plurality of levels, and copy one or more levels of the AIT to a shadow table in a portion of the volatile memory.

In some embodiments, the portion of the volatile memory is not included within the main memory.

In some embodiments, the memory controller includes AIT caches, the AIT caches including a cache for each level of the AIT stored in the nonvolatile memory. In some embodiments, upon a miss in a lookup for the nonvolatile memory, a lookup of the nonvolatile memory is to include a lookup of the shadow table. In some embodiments, upon a miss or error in the shadow table, a lookup of the nonvolatile memory is to include a lookup of at least one of the AIT caches.

In some embodiments, the nonvolatile memory is subject to wear leveling, the wear leveling including a portion of the nonvolatile memory that stores the AIT.

In some embodiments, at least one non-transitory computer-readable storage medium having stored thereon data representing sequences of instructions that, when executed by one or more processors, cause the processors to perform operations comprising: storing one or more levels of an address indirection table (AIT) of a nonvolatile memory into a second memory, the second memory comprising a volatile memory; receiving a request for an address of the nonvolatile memory; and performing a lookup of the address including performing a lookup of an address in the nonvolatile memory, and, upon the address lookup resulting in a miss, performing a lookup of the AIT stored in the volatile memory.

In some embodiments, the instructions further include instructions for caching address entries for each level of the AIT, and, upon the lookup of the AIT stored in the volatile memory resulting in a miss, performing a lookup of at least one of the AIT caches.

In some embodiments, the instructions further include instructions for performing wear leveling of the nonvolatile memory, wherein the performance of wear leveling includes wear leveling of a portion of the nonvolatile memory that stores the AIT.

In some embodiments, an apparatus includes: means for storing one or more levels of an address indirection table (AIT) of a nonvolatile memory into a second memory, the second memory comprising a volatile memory; means for receiving a request for an address of the nonvolatile memory; and means for performing a lookup of the address, including means for performing a lookup of an address in the nonvolatile memory and means for performing a lookup of the AIT stored in the volatile memory upon the address lookup resulting in a miss.

In some embodiments, the apparatus further includes means for caching address entries for each level of the AIT, and means for performing a lookup of at least one of the AIT caches upon the lookup of the AIT stored in the volatile memory resulting in a miss.

In some embodiments, the apparatus further includes means for performing wear leveling of the nonvolatile memory, wherein the performance of wear leveling includes wear leveling of a portion of the nonvolatile memory that stores the AIT.

What is claimed is:

1. A memory device comprising:
   a nonvolatile memory;
   a memory controller; and
   address indirection logic to provide address indirection for the nonvolatile memory, wherein to provide address indirection, the address indirection logic is to:
      maintain an address indirection table (AIT) in the nonvolatile memory, the AIT including a plurality of levels, and
      copy at least a portion of the AIT to a second memory, the second memory having less latency than the nonvolatile memory;
   wherein the memory controller includes AIT caches, the AIT caches including a cache for each level of the AIT stored in the nonvolatile memory; and
   wherein, upon a miss in a translation lookaside buffer (TLB) for the nonvolatile memory, a lookup of the nonvolatile memory is to include a lookup of the copy of the AIT in the second memory.

2. The memory device of claim 1, wherein upon a miss or error in one or more levels of the AIT in the second memory, a lookup of the nonvolatile memory is to include a lookup of at least one of the AIT caches.

3. The memory device of claim 1, wherein the nonvolatile memory is subject to wear leveling, the wear leveling including a portion of the nonvolatile memory that stores the AIT.

4. The memory device of claim 3, wherein the AIT stored in the nonvolatile memory and the AIT stored in the second memory are each to be updated upon a wear level move.

5. The memory device of claim 1, wherein the at least a portion of the AIT copied to the second memory includes a last level of the AIT.

6. The memory device of claim 1, wherein the second memory comprises dynamic random access memory (DRAM).

7. A method comprising:
   storing a copy of one or more levels of an address indirection table (AIT) of a nonvolatile memory into a second memory, the second memory comprising a volatile memory;
   caching address entries for each level of the AIT in AIT caches of a memory controller for the nonvolatile memory;
   receiving a request for an address of the nonvolatile memory; and performing a lookup of the address including:
      performing a lookup of an address in the nonvolatile memory,
      upon the address lookup resulting in a miss, performing a lookup of the AIT stored in the volatile memory, and
      upon a miss in a translation lookaside buffer (TLB) for the nonvolatile memory, the lookup of the nonvolatile memory to include a lookup of the copy of the one or more levels of the AIT in the second memory.

8. The method of claim 7, further comprising performing wear leveling of the nonvolatile memory, wherein the performance of wear leveling includes wear leveling of memory locations of the AIT stored in the nonvolatile memory.

9. The method of claim 8, further comprising updating the AIT in the nonvolatile memory and the AIT stored in the volatile memory upon a wear level move in the performance of the wear leveling.

10. The method of claim 7, wherein the storing of the last level of the AIT of the nonvolatile memory into the volatile memory is performed upon power up of a system including the nonvolatile memory.

11. The method of claim 7, wherein the storing of the one or more levels of the AIT includes storing a last level of the AIT.

12. The method of claim 7, wherein the volatile memory comprises dynamic random access memory (DRAM).

13. A computing system comprising:
   a network interface;
   a central processing unit (CPU) to process data and instructions and communicatively coupled with the network interface;
   a volatile memory, the volatile memory including a main memory to store data and instructions for processing; and
   a nonvolatile memory device including:
      nonvolatile memory,
      a memory controller, and
      address indirection logic to provide address indirection for the nonvolatile memory, wherein the address indirection logic is to:
         maintain an address indirection table (AIT) in the nonvolatile memory, the AIT including a plurality of levels, and
         copy one or more levels of the AIT to a shadow table in a portion of the volatile memory;
      wherein the memory controller includes AIT caches, the AIT caches including a cache for each level of the AIT stored in the nonvolatile memory; and
      wherein, upon a miss in a translation lookaside buffer (TLB) for the nonvolatile memory, a lookup of the nonvolatile memory is to include a lookup of the copy of the one or more levels of the AIT in the shadow table in the volatile memory.

14. The computing system of claim 13, wherein the portion of the volatile memory is not included within the main memory.

15. The computing system of claim 13, wherein upon a miss or error in the shadow table, a lookup of the nonvolatile memory is to include a lookup of at least one of the AIT caches.

16. The computing system of claim 13, wherein the nonvolatile memory is subject to wear leveling, the wear leveling including a portion of the nonvolatile memory that stores the AIT.

17. At least one non-transitory computer-readable storage medium having stored thereon data representing sequences of instructions that, when executed by one or more processors, cause the one or more processors to perform operations comprising:

storing a copy of one or more levels of an address indirection table (AIT) of a nonvolatile memory into a second memory, the second memory comprising a volatile memory;

caching address entries for each level of the AIT in AIT caches of a memory controller for the nonvolatile memory;

receiving a request for an address of the nonvolatile memory; and performing a lookup of the address including:

performing a lookup of an address in the nonvolatile memory, upon the address lookup resulting in a miss, performing a lookup of the AIT stored in the volatile memory, and upon a miss in a translation lookaside buffer (TLB) for the nonvolatile memory, the lookup of the nonvolatile memory to include a lookup of the copy of the one or more levels of the AIT in the second memory.

18. The medium of claim 17, further comprising instructions that, when executed by the one or more processors, cause the one or more processors to perform operations comprising:

performing wear leveling of the nonvolatile memory, wherein the performance of wear leveling includes wear leveling of a portion of the nonvolatile memory that stores the AIT.

* * * * *